(12) United States Patent
Montalvo et al.

(10) Patent No.: US 7,327,748 B2
(45) Date of Patent: Feb. 5, 2008

(54) ENTERPRISE SWITCHING DEVICE AND METHOD

(75) Inventors: Armando Montalvo, Woodland Hills, CA (US); Bryan Dietz, Lake Forest, CA (US); Yat Sen Lie, Westlake Village, CA (US)

(73) Assignee: Alcatel Lucent, Paris (FR)

( * ) Notice: Subject to any disclaimer, the term of this patent is extended or adjusted under 35 U.S.C. 154(b) by 1061 days.

(21) Appl. No.: 10/353,100

(22) Filed: Jan. 27, 2003

(65) Prior Publication Data

US 2003/0147385 A1    Aug. 7, 2003

Related U.S. Application Data

(60) Provisional application No. 60/352,983, filed on Jan. 28, 2002.

(51) Int. Cl.
*H04L 12/56* (2006.01)
*H04L 12/54* (2006.01)

(52) U.S. Cl. ....................... 370/412; 370/429

(58) Field of Classification Search ............... 370/412, 370/419, 428, 429, 386, 387, 388, 389, 463
See application file for complete search history.

(56) References Cited

U.S. PATENT DOCUMENTS

| | | | | |
|---|---|---|---|---|
| 5,167,033 A | * | 11/1992 | Bryant et al. | 709/235 |
| 5,689,506 A | * | 11/1997 | Chiussi et al. | 370/388 |
| 5,696,761 A | * | 12/1997 | Kos et al. | 370/386 |
| 5,838,681 A | * | 11/1998 | Bonomi et al. | 370/395.41 |
| 5,841,771 A | * | 11/1998 | Irwin et al. | 370/360 |
| 6,041,057 A | | 3/2000 | Stone | |
| 6,044,080 A | * | 3/2000 | Antonov | 370/401 |
| 6,047,024 A | | 4/2000 | How | |
| 6,061,356 A | | 5/2000 | Terry | |
| 6,061,368 A | | 5/2000 | Hitzelberger | |
| 6,070,243 A | | 5/2000 | See et al. | |

(Continued)

OTHER PUBLICATIONS

Mark Piekarski, "Reinventing the Switch fabric Architecture", Jun. 1, 2001;☐☐http:/www.commsdesign.com/csdmag/sections/feature_article/showArticle.jhtml?articleID=16502927☐☐Fig. 1.*

(Continued)

*Primary Examiner*—Kwang Bin Yao
*Assistant Examiner*—Vaibhav Sawhney
(74) *Attorney, Agent, or Firm*—Bobby D. Slaton; Craig A. Hoersten (57) ABSTRACT

A high speed switching device including an aggregator, a plurality of intermediate ports, and ingress packet processing resources, is disclosed. The aggregator includes an external switch port operatively coupled to a transport medium, and a demultiplexer that divides an ingress data stream into a plurality of intermediate streams. The plurality of intermediate ports transmit the intermediate streams to ingress packet processing resources. The ingress packet processing resource may include one or more classification devices for parsing, switching or routing, and queueing packets of the ingress stream, prior to transmission to a switching fabric. The switching device optionally includes an egress processor for multiplexing egress data from the switching fabric. Intermediate port traffic may be dynamically modified to minimize load imbalance present in an ingress switching device and or egress switching device. Load balancing may further be achieved by optimization of the physical wiring connections between the aggregator and classification devices.

11 Claims, 5 Drawing Sheets

U.S. PATENT DOCUMENTS

| | | | |
|---|---|---|---|
| 6,088,745 | A | 7/2000 | Bertagna et al. |
| 6,094,430 | A | 7/2000 | Hoogenboom |
| 6,363,077 | B1* | 3/2002 | Wong et al. ............... 370/422 |
| 6,385,209 | B1* | 5/2002 | Skirmont et al. ........... 370/419 |
| 6,473,424 | B1 | 10/2002 | DeJager et al. |
| 2001/0053149 | A1* | 12/2001 | Mo et al. .................... 370/389 |
| 2002/0154648 | A1* | 10/2002 | Araya et al. ................ 370/412 |

OTHER PUBLICATIONS

Institute of Electrical and Electronics Engineers, Inc., IEEE Standard 802.3-2002: "IEEE Standard for Information technology—Telecommunications and information exchange between systems—Local and metropolitan area networks—Specific requirements—Part 3: Carrier Sense Multiple Access with Collision Detection (CSMA/CD) access method and physical layer specifications," Clause 43: "Link Aggregation," pp. 282-345.

* cited by examiner

ENTERPRISE SWITCHING DEVICE AND METHOD

CROSS-REFERENCE TO RELATED APPLICATION

This application claims the benefit of U.S. provisional application 60/352,983, filed Jan. 28, 2002, the contents of which is hereby incorporated herein by reference for all purposes.

BACKGROUND

The present invention generally pertains to switches, routers, and switch routers used to direct relatively high speed data streams within a network. In particular, the invention pertains to a switching device for dividing a relatively high speed data stream into a plurality of relatively low speed data streams, which when properly balanced, allow the switching device to process the relatively high speed data stream at wire speed with minimal data loss.

High performance Ethernet layer 2 and 3 switching at 1 Gbps is well understood in the art and embodied in a number of commercial products, including those of the assignee of this application. However, ultra-fast switching at wire speeds at or above 10 Gbps presents numerous engineering obstacles. Some of these obstacles require that existing hardware for implementing fast Ethernet be significantly re-engineered to perform even faster data processing and to incorporate functionality previously implemented in software. The solution to ultra-fast Ethernet requires substantial resources, including time and capital investment. In consideration of this substantial investment, there is thus a need to capitalize on the variety of existing switching hardware operable at gigabits speeds, which is readily available and whose reliability is proven.

SUMMARY

In response to the needs set forth above, the present invention reliably achieves layer 2 and layer 3 switching at 10 Gbps wire speeds using presently available hardware. In the preferred embodiment, the switching device of the present invention is operatively connected to a plurality of switches, routers, and or combination switch routers by means of a fabric switching network.

The switching device of some embodiments comprises an aggregator and a plurality of ingress packet processing resources. An ingress packet processing resource in some embodiments is a traffic classifier, rate policer, accounting device, editing device, or an address look-up device. In the preferred embodiment, the ingress packet processing resources are classification devices. The aggregator, which is operatively connected to the transport medium, receives a relatively high speed serial data stream referred to as a high speed ingress data stream. The aggregator, specifically the demultiplexer, demultiplexes the high speed ingress data stream and distributes the protocol data units, e.g. frames, of the data stream into a plurality of relatively low speed data streams that are communicated to the classification devices by means of what are referred to herein as intermediate ports. The classification devices include an ingress processor, each comprising flow resolution logic and queue manager, that receives one or more relatively low speed data streams via the intermediate port, determines the destination of the frames, processes the frames for switching and or routing, causes the frames to be buffered prior to forwarding the frames to the fabric switching network in the direction of destination port. In some embodiments, the classification devices of the switching device further include an egress processor, and the aggregator further includes a multiplexer. The egress processors include means for receiving frames from the fabric switching network, which are then combined into a single relatively high speed data stream by the multiplexer.

In some embodiments, the load balance within a switching device is improved by a carefully selected ordering of the physical wiring connections between the output of the aggregator and the input of the classification devices. Because of the inherent characteristic of the load balancing algorithm of the aggregator, relatively more ingress traffic from the aggregator may be distributed to the wiring connections corresponding to some input values than to others. This potential load imbalance can be minimized by evenly distributing wiring connections corresponding to aggregator input values with higher than average traffic across consecutive classification devices.

In other embodiments, a plurality of switching devices are operatively coupled by means of a fabric switching network, collectively called a system of switches. The switching devices of the system include means for assigning the propagation path of a frame through the egress switching device. The system therefore permits the load within an ingress switching device to be distributed so as to maximize the throughput of the ingress and minimize the number of dropped frames. Preferably, a frame received in an ingress switching device is assigned to and then forwarded toward the intermediate port of an egress switching device. Preferably, each classification device of each ingress switching device is capable of directing frames to each of the intermediate ports of the egress switching device. The particular intermediate port of the egress switching to which a frame is assigned is determined from look-up tables stored in memory devices on the ingress switching device. Look-up tables stored in memory devices of the ingress switching device provide the basis for determining for each frame an assignment to particular intermediate port. The tables, referred to as queue identification-to-port tables, provide for rapid and versatile reference.

In some embodiments, the queue identification-to-port tables are assigned by default to minimize potential imbalance that may cause traffic at some intermediate ports to be favored over other intermediate ports. In these embodiments, the tables are configured such that the consecutive classification devices forward frames to consecutive intermediate ports of the egress switching device. In particular, the first classification device of a switching device may hash ingress traffic to intermediate ports numbers 1 through J in that order. The second classification device of the ingress switching device then hashes traffic to the intermediate ports 2 through J and the remaining queue identification then assigned to intermediate port number 1. The pattern is then repeated for the remaining classification devices. Each of the classification devices of the ingress switching device thus maintains the same group order with the exception of an incremental offset between classification devices, the incremental offset in the preferred embodiment is a single port offset.

In some other embodiments, the system of switches further includes a program manager that monitors the traffic across the intermediate ports of a switching device and redirects some of this traffic from relatively heavily loaded intermediate ports to relatively under loaded intermediate ports. The program manager preferably makes periodic adjustments to the queue identification-to-port tables of one or more ingress switching devices in order to balance the load across the intermediate ports of one or more egress switching devices.

The method of switching and routing the frames of a relatively high speed data stream, according to some embodiments of the present invention, includes the steps of receiving the relatively high speed ingress data stream; demultiplexing the relatively high ingress data stream into a plurality of relatively low ingress data streams; parsing the plurality of relatively low ingress data streams into a plurality of protocol data units; processing each protocol data unit for purposes of either switching or routing the protocol data unit; and transmitting at least one protocol data unit to an egress switching device. The method of transmitting comprising the steps of determining which of a plurality of intermediate ports of an egress switching device to forward the protocol data units, buffering each processed protocol data unit in queue memory, and forwarding the protocol data units to an inter-communication network. The inter-communication network is preferably a switching network operably connecting a plurality of switches, routers, and/or switching devices. In some embodiments however, the inter-communication network is an aggregation system including a plurality of trunk links for communicating multiple data streams in parallel flows.

In some embodiments, the method further selects the ordering of the physical wiring connections between the output of the aggregator and the input of the classification devices to distribute the relatively low speed data streams corresponding to intermediate ports that have higher than average traffic to consecutive classification devices. In other embodiments, the port assignments from the classification devices of an ingress switch to the intermediate ports of an egress switch are configured such that consecutive classification devices hash to the same grouping of intermediate ports, the sequential order of the intermediate ports differing by an incremental offset between classification devices. In still other embodiments, the assignment of the queue identifications to intermediate ports is dynamically updated by a program manager at periodic intervals. The program manager preferably re-distributes traffic from relatively high-traffic intermediate ports to relatively low-traffic intermediate ports in order to balance the internal load and increase throughput.

BRIEF DESCRIPTION OF THE DRAWINGS

FIG. 2A is a block diagram of an ingress switching device operably connected to a program manager according to the preferred embodiment of the present invention.

DETAILED DESCRIPTION

Figure 1:
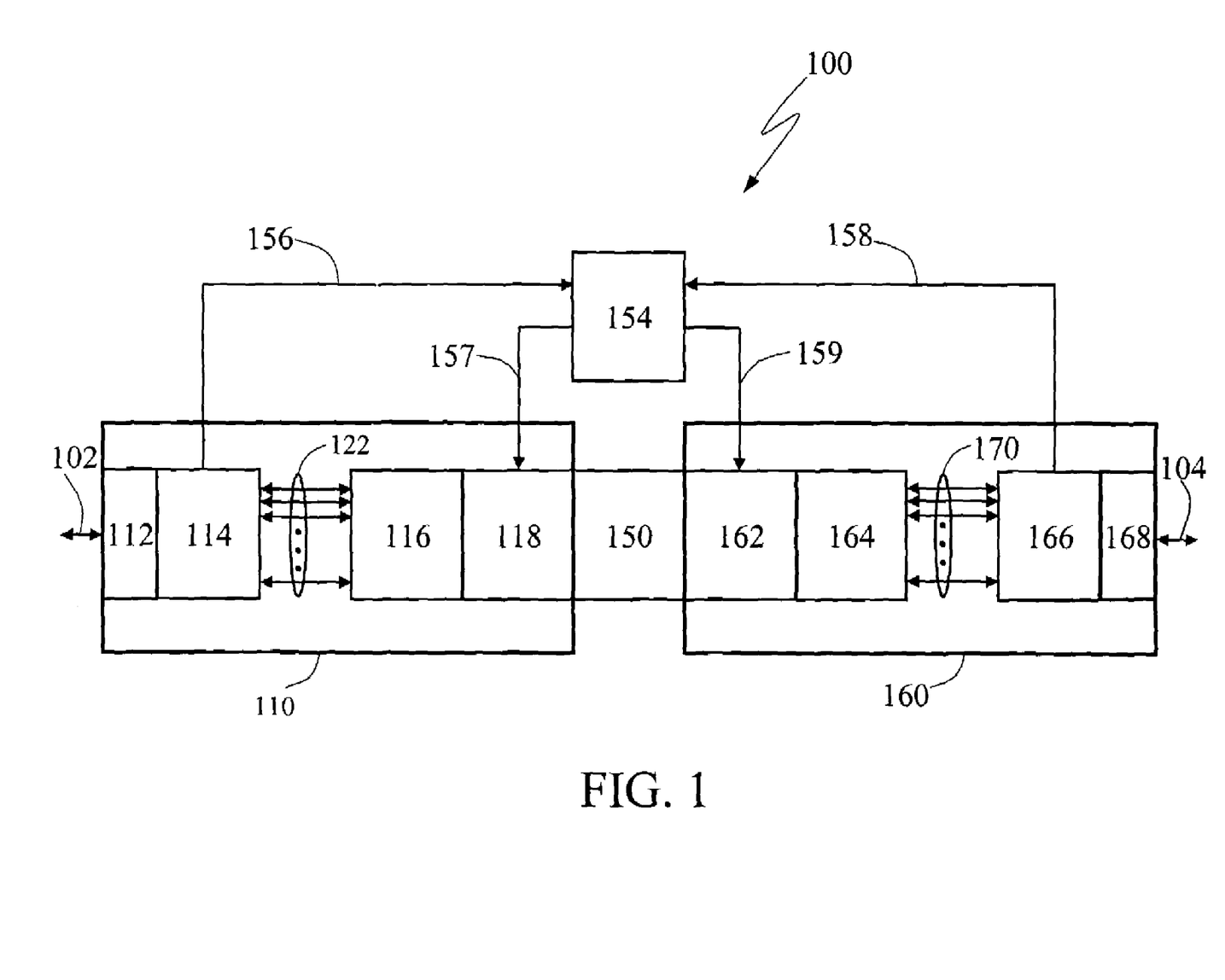
FIG. 1 is a block diagram of a system of switches according to the preferred embodiment of the present invention.

Referring to FIG. 1, a block diagram of system of switches according to the preferred embodiment of the present invention. The system 100 according to some embodiments includes an ingress switching device 110 and egress switching device 160, each operatively coupled to the other by means of an inter-communication network. The intercommunication-device is either a fabric switching network 150 in some embodiments, or the trunk links of an aggregation system. The switching devices 110 and 160 are substantially identical to one another, although their function depends on direction of propagation of data through the switching device. The switching devices 110 and 160 are two of a plurality switching devices operatively coupled to the fabric 150. The system 100 in turn is one element of a network which may include one or more local area networks (LAN) and virtual LANs (VLAN), switches, routers, bridges, and hosts.

The switching devices 110 and 160 are operatively coupled to a first transport medium 102 and a second transport medium 104, respectively. The transport media 102 and 104 link nodes in a network and direct packets, otherwise known as frames or protocol data units, to and from the system of switches 100. The transport media 102 and 104 generally support relatively high transmission rates, and include data packets that are aggregated from many serial data flows. In general, each of the packets includes source & destination address information including IP addresses and medium access control (MAC) addresses, control settings, and data. Each of the switching devices 110, 160 of the preferred embodiment is adapted to detect the format of the frame, which will vary depending on the standard (for example, Ethernet II, IEEE 802.3, IEEE 802.3 with IEEE 802.2 LLC, or IEEE 802.3 with IEEE 802.2 LLC and Sub Network Access Protocol (SNAP)), and isolate the addressing information for purposes of distributing the frame to the appropriate port.

In the present embodiment, the switching devices 110 and 160 are full duplex 10 Gbps Ethernet switching devices that conduct between the transport medium and fabric 150 in both directions. One skilled in the art will however recognize that the invention may be adapted for purposes of other network topologies including asynchronous transfer mode (ATM) and token ring networks. For purposes of this application, data flowing into a switching device from the transport media toward the fabric 150 is referred to herein as ingress data, and the switching device through which ingress data propagates is generally referred to as the ingress switching device. Furthermore, data flowing from the fabric 150 to a transport media is referred to as egress data, and the switching device that supports egress data output is referred to as egress switching device. Each of the plurality of switching devices of the present embodiment is both an ingress switching device and an egress switching device depending on the relative direction that the frame is being transmitted. A full duplex switching device is able to transmit ingress and egress data flows simultaneously.

The switching device 110 is preferably comprised of an external port, i.e. physical port 112, aggregator 114, at least one MAC Engine 116, and a plurality of classification devices 118. A classification device is one of a multiplicity of ingress packet processing resources which, when coupled to the aggregator, are able to efficiently process high speed data streams while preferably taking advantage of the static and dynamic load balancing schema taught herein. The ingress packet processing resource in some embodiments is a traffic classifier, rate policer, accounting device, editing device, or an address look-up device. A second switching device 160, which is substantially identical to switching device 110, includes a physical port 168, aggregator 166, at least one MAC Engine 164, and a plurality of classification devices 162. The switching devices 110 and 160 are two of a plurality of switching devices operably coupled to the fabric 150. One skilled will, however, recognize the applicability of the present invention to: numerous other switching devices, different switching speeds, aggregation switches, and transport media alternatives including twisted pair and coaxial cable.

Preferably, each switching device 110, 160 is adapted to receive ingress data, parse the data to determine is destination, and then perform either layer 2 switching or layer 3 routing of the frame prior to forwarding the packet to the fabric 150. In this embodiment, egress data received from the fabric 150 is retransmitted by the switching device to the corresponding physical port.

The switching device port, i.e. physical port, 112 provides an interface to the transport medium 102, which is a fiber optic cable in the preferred embodiment. The fiber optical cable carries either 850 nm wavelength signal for short distance, i.e. less than 10 km, and 1310 nm wavelength signal for long distance, i.e. longer than 10 km. The optical signal received at the physical port 112 is converted to electrical signals at the rate of 10 Gbps, as indicated by the data flow from left to right in FIG. 1. Because the 10 Gbps Ethernet switching device is preferably full duplex, the physical port 112 also converts electrical signals to optical signals at a rate of 10 Gbps. One skilled in the art will recognize, because of the variety of physical and optical fiber optic connection types, that the physical port 112 may be partially or completely contained in an industry-standard fiber optic module such as XENPAK, XPAK, XFP, MSA 300, or MSA 200.

The electrical impulses generated by the physical port 112 are conveyed to the link aggregator 114 by means of module connectors and wiring. The aggregator includes a demultiplexer for processing the ingress data stream, and a multiplexer for processing the egress data streams. With respect to the ingress data stream, the purpose of the demultiplexer of the link aggregator 114 is to separate frames of the ingress data stream and distribute them uniformly across a plurality of narrower bandwidth communication channels referred to herein as "intermediate ports" 122. With the possible exception of addressing and control bits, the individual frames themselves are preferably unmodified by aggregator 114. This distribution process, generally referred to as demultiplexing, is employed in aggregation schemes to distribute traffic across a plurality of parallel communication links, or trunks, between two nodes in a network, thereby increasing capacity without increasing the speed of the switching. In the present invention, demultiplexing the relatively high speed 10 Gbps serial data stream into multiple, parallel data streams of approximately 1 Gbps each also reduces the complexity and cost of processing. In particular, the processing associated with parsing, switching, routing, and buffering may be performed by existing components at significantly lower speeds than the 10 Gbps rate of the switching device port.

As a constraint, the aggregator 114 preferably distributes all packets of an ingress data flow to the same intermediate port by way of the same internal transmission path between an aggregator and the corresponding classification device. All frames, characterized by the same IP or MAC addresses, for example, should, therefore propagate through the ingress switching device by means of a common intermediate port from the plurality of intermediate ports 122. Transmission of packets of a single data stream across multiple data propagation paths over different intermediate ports may cause packets to be received by the egress switching device port, and therefore by the node in non-sequential order. The non-sequential order of reception causes some packets to be discarded the destination host or re-requested by the destination host of the source host.

The ingress data transmitted by means of the intermediate ports 122 are directed to at least one MAC Engine 116. In general, the MAC engines 116 then detect, buffer, and retransmit the frames to the plurality of classification devices 118. In turn, the classification devices 118 parse each packet, determine its destination port, and retransmit the packet to the appropriate output switching device port. The classification devices may perform functions layer 3 routing, as well. From the classification devices 118, packets are forwarded to the fabric 150 where they are potentially forwarded to any port accessible to the fabric 150.

Egress data transmitted from the fabric 150 to an egress switching device 160 propagates through any one of a plurality of switching devices, depending on its destination address. If transmitted to the switching device 160, a frame is conveyed to a classification device 162, to a MAC Engine 164, across one of a plurality egress intermediate ports 170. The packets transmitted over the egress intermediate ports 170 are transmitted to the aggregator 166 where the plurality of relatively low data streams are multiplexed by the multiplexer to form a single relatively high speed data stream. The aggregator high speed data stream is converted to an optical signal at physical port 168 where it is transmitted over the transport medium 104.

In the preferred embodiment, the ingress switching devices are capable of distributing frames through any of the intermediate ports of an egress switching device like that described in the preferred embodiment. In particular, the classification devices 118 of an ingress switching device 110 permits the internal propagation path between the classification device 162 and physical port 168 of an egress switching device 160 to be programmed and updated in real time. The propagation path between a classification device and the physical port 168 from which to select includes any one of the intermediate ports 170 of the egress switching device 160. Selection of the appropriate intermediate port preferably depends on the load distribution of each of the intermediate ports of the egress switching device and or any load imbalance thereof.

In some embodiments, the propagation path of egress data between the fabric 150 and the aggregator 166 of the egress switching device is regulated by a program manager 154. The program manager 154, which preferably includes a central processor, monitors egress traffic data acquired from a plurality of aggregators 114 and 166, for example, to determine the extent of any traffic imbalance on the intermediate ports 122 and 170, respectively. If necessary, the switching manager in some embodiments, may reassign the propagation path assignment used by an ingress switching device to balance the traffic on the egress intermediate ports and minimize the possibility of any internal segment of an egress switching device being over-subscribed and with the over-subscription, frames being lost. Statistics acquired from the aggregators 114 and 166 are communicated to the program manager 154 by means of connections 156 and 158, respectively. The assignment of the propagation path by the program manager 154 is transmitted to the classification devices 110 and 160 by means of connections 157 and 159, respectively.

Figure 2B:
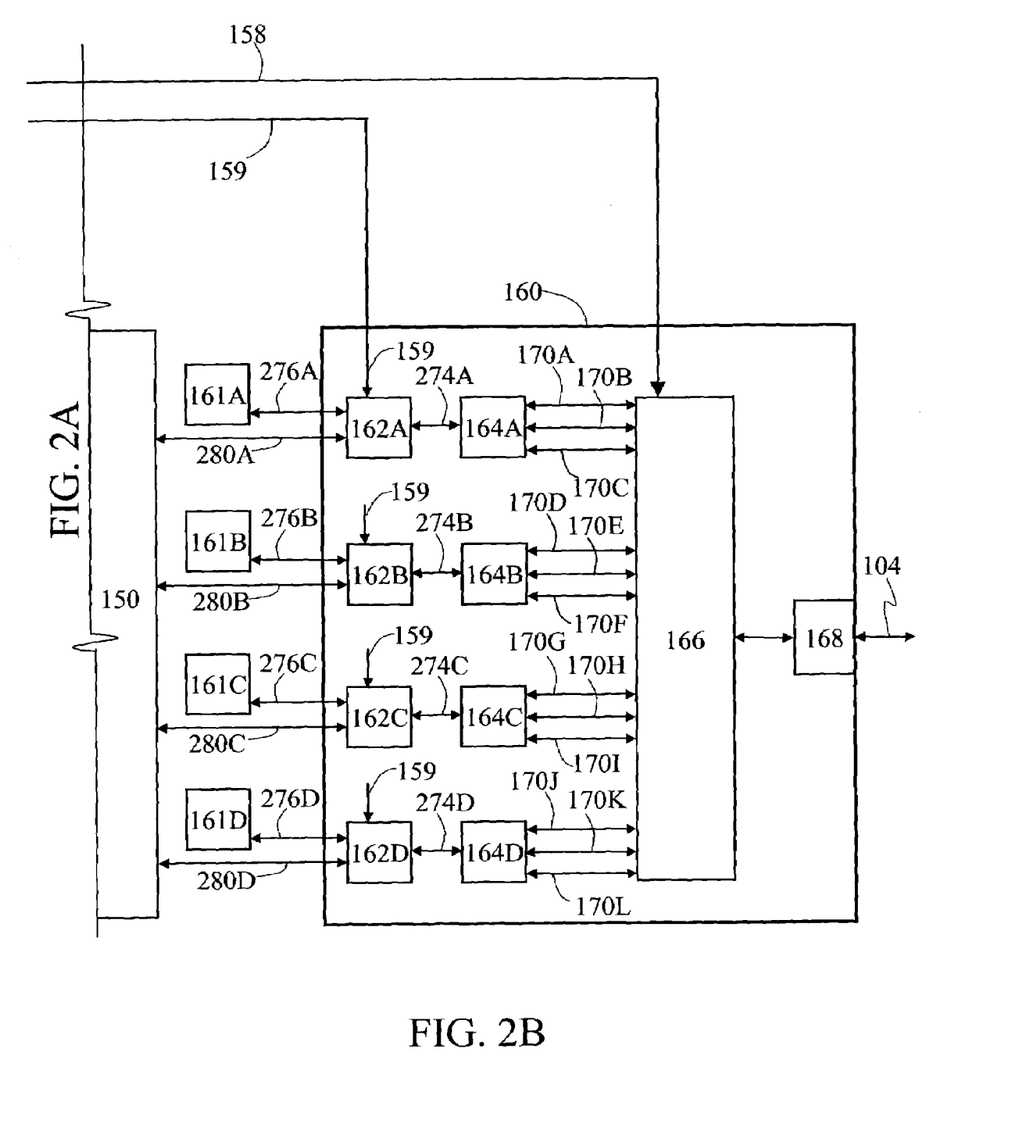
FIG. 2B is a block diagram of an egress switching device according to the preferred embodiment of the present invention.

Referring to FIGS. 2A and 2B, a block diagram of the ingress and egress switching devices according to the preferred embodiment of the present invention are illustrated. As described above, the incoming optical signal is converted by the physical port 112 to the electrical signal 120 conveyed to the link aggregator 114. In the preferred embodiment of the 10 Gbps Ethernet switch, the link aggregator 114 is a switch processor, model number BCM5632 available from Broadcom® Inc. of Irvine, Calif. The BCM5632 switch processor includes twelve 1 gigabit per second ports. The link aggregator 114 divides the 10 Gbps ingress data flow into twelve relative-low bandwidth flows conveyed to the intermediate ports 122, namely ports 122A-L. The distribution of the data flows across the twelve intermediate ports 122A-L may be executed by any one of a number of load distribution functions available to those skilled in the art (e.g., a hash functions).

An ideal load-balancing algorithm would produce twelve substantially identical flow rates to uniformly balance the load between intermediate ports 122A-L. In practice, however, the ingress data is processed extremely quickly and with some compromise in the uniformity. A "hash" function is conventionally used to balance the load across the plurality of parallel data streams. In this embodiment, the BCM5632 switch processor 114 employs a first hash function for purposes of consistently providing the same port assignment for packets of a common data flow. The four steps used to compute the first hash function are as follows: First, the key fields are selected and the bits concatenated in a predetermined order. Second, an industry-standard CRC-32 cyclic redundancy checksum is then calculated on the concatenated keys. Third, the 32-bit checksum result is truncated to M bits by deleting its most significant bits. Fourth, the value of the resulting M-bit is divided by the number of ports N. The integer remainder of this division is the hash result.

The hash result can be visualized as dividing all possible key values into $2^M$ groups called "bins". The $2^M$ bins are further divided into N unique hash results, where N is smaller than $2^M$.

The predetermined bits used as the input or key to the hash function are preferably portions of one or both of the MAC address and IP address, the Ethertype, VLAN identification, TCP/UDP port numbers, or a combination thereof.

Figure 3:
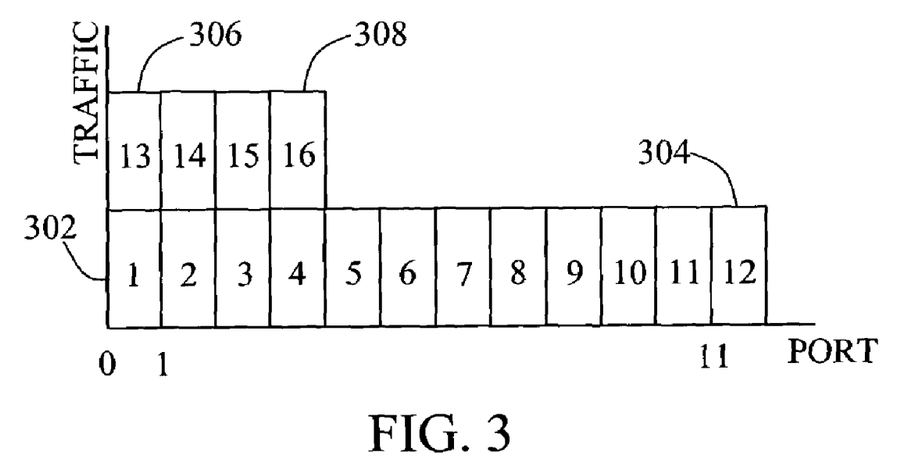
FIG. 3 is a diagrammatic illustration of the bin assignment as a function of the intermediate port number for the case of M=4, M'=16 and N=12.

The first hash function provides a reasonable load-distribution function in the situation where M' (equal to 2 to the power M) is relatively large compared to N, and there are a large number of addresses randomly distributed. The first hash function, would, however, benefit from remedial measures to correct for systematic load imbalance. If left uncorrected, a systematic load imbalance may cause traffic in some systems to exceed the capacity of an ingress intermediate port or classification device, thereby resulting in dropped frames. The detrimental effect of the first hash function is most severe where (a) N is approximately equal to but less than M', (b) a high traffic rate is dominated by a small number of address producing that corresponds to a small number of unique hash results, or (c) where the maximum value of M' is not an integer multiple of N. The phenomena is illustrated in FIG. 3 which shows the bin assignment as a function of the intermediate port number for the case of M=4, M'=16 and N=12. As illustrated, sixteen bins 302 through 308 are assigned to twelve intermediate ports numbered zero through eleven. The bins 302 though 304 represent the first twelve bins assigned to ports zero though eleven, respectively. The remaining four bins, represented by bins 306 through 308, wrap around and are generally assigned to ports zero through four. As one skilled in the art will recognize, the first hash function causes the first four intermediate ports zero through three to be assigned twice as much traffic on average as the remaining eight ports, four through eleven. Although one may reduce this disparity by increase the number of bits (M) retained in the first hash function, the requisite division required becomes increasingly burdensome on system resources.

Figure 4:
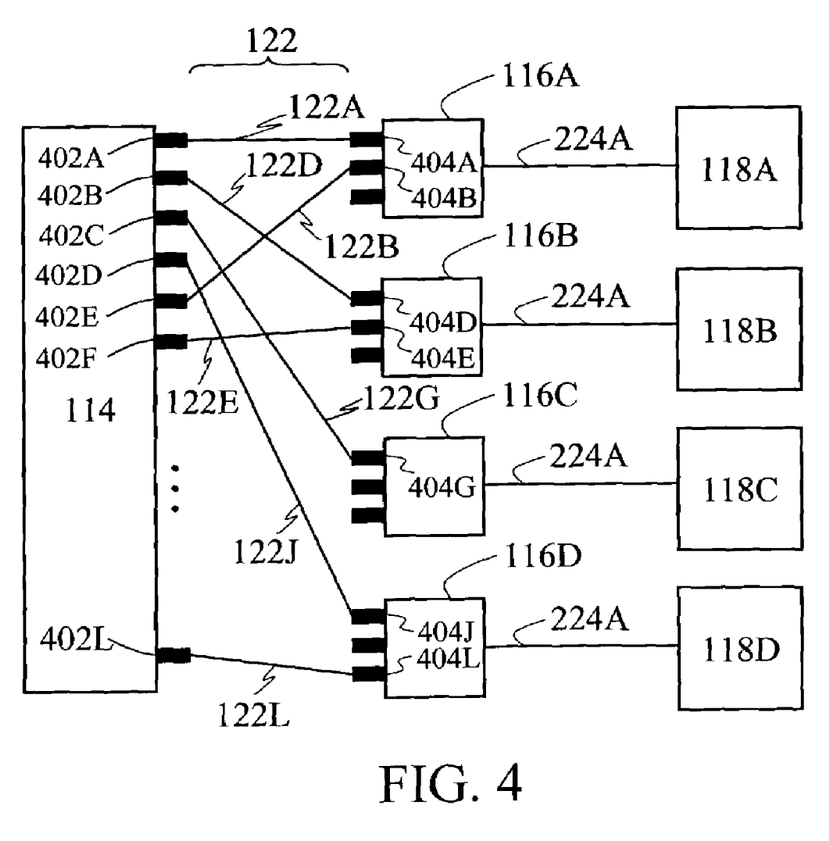
FIG. 4 is a wiring diagram including an aggregator and a plurality of MAC Engines and classification devices.

To improve the uniformity of the load distribution produced by hashing, and remedy the load imbalance of the ingress intermediate port 122A-L identified above, the preferred embodiment implements a novel wiring scheme. The wiring diagram including an aggregator and a plurality of MAC Engines and classification devices is illustrated in FIG. 4. The twelve low bandwidth ports associated with the aggregator 114, namely ports 402A-L, are physically wired and operatively coupled to the MAC Engines 116A-116D in the present embodiment such that the first four ports, 402A-402D, which tend to have higher than normal traffic due to the imperfect characteristics of the load balancing algorithm, are associated with each of the four classification devices 118A-118D, respectively. The corresponding intermediate ports are indicated by intermediate ports 122A, 122D, 122G, and 122J.

The remaining low bandwidth ports, 402E-L, associated with the aggregator may then be assigned arbitrarily. In the present embodiment, the interconnection of the low bandwidth ports 402E-L to the classification devices 118A-D is selected such that classification device 118A receives traffic associated with the first 402A, fifth 402E, and ninth low bandwidth ports; classification device 118B receives traffic associated with second 402B, sixth 402F, and tenth low bandwidth ports; classification device 118C receives traffic associated with the third 402C, seventh, and eleventh low bandwidth ports; and classification device 118D receives traffic associated with fourth 402D, eighth, and twelfth low bandwidth ports. The average traffic through each of the classification devices 118A-118D is then expected to be substantially equal, thereby providing a hardware solution to the inherent load imbalance provided by the first hash function.

As a rule, the nth low bandwidth port of N total ports is mapped to the pth classification device of P total devices such that the following formula is true: p=(n modulo P), where $0 \leq n \leq N-1$ and where $0 \leq p \leq P-1$.

Using the wiring scheme set forth above, twelve ingress data streams are transmitted from the aggregator 114 to MAC Engines 116A-D. The purpose of the MAC Engines is to determine the start and end of each frame of each of the ingress data streams on the three corresponding intermediate ports, and then multiplex the data streams of those the intermediate ports into a single stream provided as an input to one of the plurality of classification devices 118A-D. As illustrated in FIGS. 2A and 2B, each MAC Engine 116A-D is operatively coupled to three intermediate ports on the ingress side, and to a single classification device 118A-118D on the egress side. In this embodiment, each of the MAC Engines 116A-D processes three 1 Gbps ingress data streams for a total throughput of up to 3 Gbps, well in excess of the average 0.83 Gbps (10 Gbps/12 ports) generated by each low bandwidth port of the aggregator when operating at the transport medium 102 wire rate.

The ingress data flows generated by the MAC Engines are conveyed to one of a plurality of classification devices 118A-D, each of which is essentially comprised of two sections: an ingress processor for receiving ingress data from the aggregator, processing, and distributing data to the fabric 150; and an egress processor for receiving egress data from the fabric and distributing data to the aggregator. The primary purpose of the ingress processor is to manage ingress data transmitted from the MAC Engine 116. The destination port refers to the physical port associated with any of the switching devices accessible to the fabric 150 to which packets may be transmitted. The classification devices 118A-D may rely on memory devices 220A-D to queue and buffer ingress data prior to distribution to the fabric 150. The fabric switch 150 operatively couples each switching device to every other switching device accessible through the fabric 150. The ingress switching device may therefore transmit any frame to any other switching device. These switching devices may include Ethernet switches operating at 10, 100, or 1000 Mbps, depending on the implementation.

Figure 5:
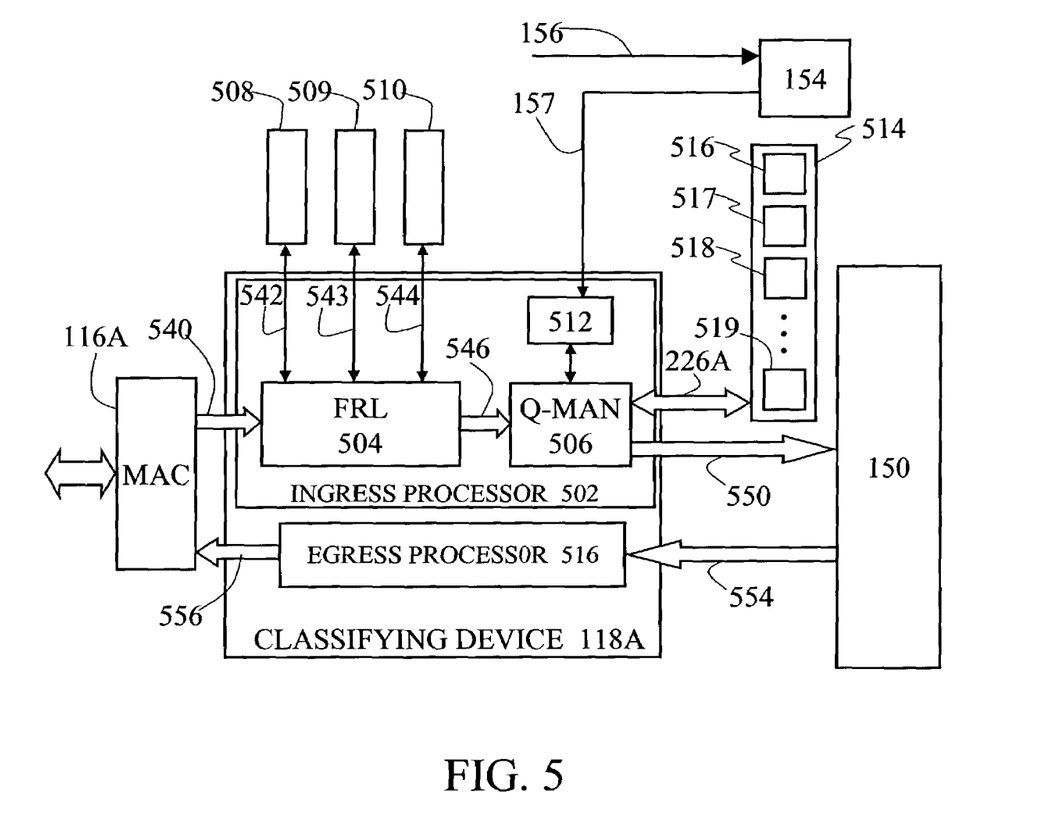
FIG. 5 is a block diagram of a classification device according to some embodiments of the present invention.

Referring to FIG. 5, a block diagram of a classification device according to some embodiments of the present invention is illustrated. The representative device 118A is one of a plurality of classification devices operatively coupled to the aggregator 114. The classification device 118A is preferably comprised of an ingress processor 502 and an egress processor 516. The ingress processor 502 parses the incoming packets from the MAC Engine 116A, determines the physical destination port of the packet, and forwards the frame to its destination port. The egress processor 516 preferably buffers egress data transmitted from the fabric 150 and re-transmits the flow to the physical port 112. On skilled in the art will recognize that the ingress and egress processors may be integrated into a single ASIC, a single board, or be implemented separately from one another.

In the preferred embodiment, the classification devices 118A-D are Coronado™ ASICs sold by Alcatel of Calabasas, Calif., and operate at a speed of 2.66 Gbps. The collective throughput of the classification devices 118A-D should be equal to or greater than the wire speed of the transport medium 102.

The ingress processor 502 is comprised of a flow resolution logic (FRL) 504, queue manager 506, and one or more memory devices 512. The purpose of the FRL 504 of the preferred embodiment is to parse the incoming data stream, determine whether to switch or route the frame to the next node, and forward the re-encapsulated frame to the queue manager. In particular, the FRL 504 parses the ingress data stream 540 from the MAC Engine 116A, examines the packet header for addressing and control information necessary to either switch or route the frame, performs address look up, and encapsulates the packets for routing.

The address information extracted by the FRL 504 may include, for example, the MAC source address (MAC SA) and destination address (MAC DA), the IP source address (IP SA) and destination address (IP DA), and a VLAN tag if present. The source addresses and destination addresses of the received frame are preferably searched in lookup tables 508-510 retained in off-chip memory devices such as SRAM and SDRAM. The source address is used to "learn" the associated port number of the attached device, while the destination addresses are necessary to forward the frame. The addressing information and mapping information is preferably stored in three tables include the MAC source address table (SAT) 508, the MAC destination address table (DAT) 509, and the IP address table (IPAT) 510.

The first lookup table 508, referred to as the source address table (SAT), retains a record of the port number corresponding to each IP SA. To expedite the searching in some embodiments, a predetermined number of bits selected from the MAC SA are used as a hash key, or pointer, to the memory location of the source address (SAT) 508. To account for different addresses that hash to the same address location, the memory may include one or more flags to indicate overflow memory locations and a pointer to the location of the overflow entry. If the source address is not recognized, the table is updated by recording the incoming port number and address at the memory location corresponding to the hash key or an overflow memory cell. In some embodiments, the SAT 508 also retains the VLAN number corresponding to the SA for purposes of authenticating the SA of a frame.

After searching the SAT 508 in some embodiments, the FRL 504 then determines whether to switch the frame within the LAN or route it to the next node. A frame is switched within the LAN if the MAC DA is different than that of the switching device 110. A frame is routed if the MAC DA is that of the switching device 110 and the IP DA is not.

Whether a packet is switched or routed the FRL retrieves a queue identification number (QID). In the present embodiment, each destination port number is associated with at least one QID. Note, however, each port may have any number of QIDs associated with it. Multiple QIDs may be implemented, for example, to prioritize a plurality of data streams all destined for a single port. The QID in the preferred embodiment is used to specify, i.e. map to, an output port. The output port may be the physical port of a standard switch, or one of the intermediate ports associated with an egress switching device such as the 10 Gbps Ethernet switching device 160 of the present invention. In other embodiments, the QID refers one of a plurality of groups of trunks used in an aggregation network to link the system of switches 100 to another node. One skilled in the art will recognize that additional QID numbers may be directed to and provide data for software routines that perform various management functions including updating address tables to "learn" new addresses.

If a frame is to be switched, the FRL 504 accesses the DAT 509 to look up the QID corresponding to the MAC DA of the received frame. The frame is then transmitted to the queue manager 506 with the QID by means of connection 546. The frame is preferably unmodified.

If a frame is to be routed, the FRL 504 preferably uses the IP DA to retrieve a QID from the IPAT 510. The MAC address of the node to which the frame is to be forwarded is provided as the new MAC DA, and the MAC address of the switching device 110 provided as the new MAC SA. The revised MAC address and frame are then forwarded by means of connection 546 to the queue manager 506 with the QID. In addition, conventional routing functions including decrementing the TTL are also performed at the FRL 504.

The primary purpose of the queue manager 506 is to determine the port number corresponding to the QID and buffer the frame until the fabric 150 is able to receive the frame. With the QID, the queue manager 506 retrieves the corresponding port number from memory device 512 where a look-up table is stored. The queue manager 506 then temporarily transmits 226A and stores the frame in buffer memory 514 until the fabric 150 signals that it is able to receive the frame. The QID is preferably used to assign the memory location of each of queues 516-519 in buffer memory 514. When the fabric 150 is available, the queue manager 506 retrieves the frame from buffer memory 514, attaches a tag containing the egress port number to the frame, and conveys the frame and tag to the fabric 150 by means of channel 550.

In the preferred embodiment, each QID is assigned to either a physical port number or one of the intermediate ports of an egress switching device. All of the intermediate ports associated with the same relatively high speed port are assigned QIDs from a separate group of 12 or more consecutive QID numbers. For example, a group of intermediate ports 170 might have QID numbers from the group J, J+1, J+2, J+3, . . . , J+11. When the base QID J refers to a group of intermediate ports or an aggregation group, the FRL 504 also can also compute an offset between the lowest QID of a group and the designated QID. The offset is then added to the base QID to yield an "effective QID." The queue manager 506 then uses the effective QID to determine the assigned intermediate port number of the egress switching device 160. In some embodiments, the offset is derived from a second load balancing hash function wherein a select number of bits from the address information contained in the frame, preferably, the IP SA and IP DA or the source MAC and destination MAC. One skilled in the art will recognize various other forms of load balancing algorithms and hash keys useful for generating a desirable distribution of traffic loading across the various intermediate ports of the egress switching device.

In the preferred embodiment, the intermediate port number for each effective QID is assigned so as to minimize the effect of any systematic error resulting from the second load balancing hash function described immediately above. The assignment scheme preferably relies an incremental offset between consecutive classification devices. In particular, effective QIDs corresponding to the first classification device 118A are consecutively ordered and are assigned to consecutive intermediate ports, e.g. 170A-G of a switching device 160. The effective QIDs corresponding to the second classification device 118D are assigned to consecutive intermediate ports 170A-G with a single-port shift. The assignment of the port numbers at the third classification device 118C has a two-port shift with respect to that of the first device 118A, while the fourth classification device 118D has a three-port shift with respect to that of the first device 118A.

Using the assignment scheme immediately above, the first classification device 118A maps its consecutive QIDs to intermediate port numbers 170A through 170L. The second first classification device 118B maps its consecutive QIDs to intermediate ports 170B through 170L, and the last QID to port number 170A. Third classification device 118C maps its consecutive GIDs to intermediate ports 170C through 170L, and the last two QIDs to intermediate ports 170A and 170B. The QID to port mapping using this form of a modulo-12 operation is done for all classification devices of each switching device that receives ingress data.

In some embodiments, the QID-to-port assignment table 512 is retained by re-writable memory device, and is dynamically updated by the program manager 154 to alleviate egress load imbalance. The program manager 154 collects statistics from the aggregators including the bytes per second of egress data flow for each intermediate port 170A-G, which serves as a statistical measure of the load imbalance. This information is conveyed to the program manager 154 by means of channels 156 and 158, for example. Based upon the detected imbalance, the program manager 154 modifies the QID-to-intermediate port mapping at one or more ingress classification devices to redirect traffic at the egress switching device from a high-traffic intermediate port to a low traffic intermediate port. For example, the mapping in the table 512 in ingress switching device 110 is reassigned to change the port assignment such that the egress traffic of an over-subscribed intermediate port on the egress switching device 160 is diverted to an under-subscribed intermediate port. By reassigning relatively high traffic flows away from oversubscribed intermediate ports 170, the system resources are better allocated and the overall throughput of the egress switching device 160 increased. The QID-to-intermediate port mapping is preferably updated periodically, every sixty seconds in some embodiments.

Figure 6:
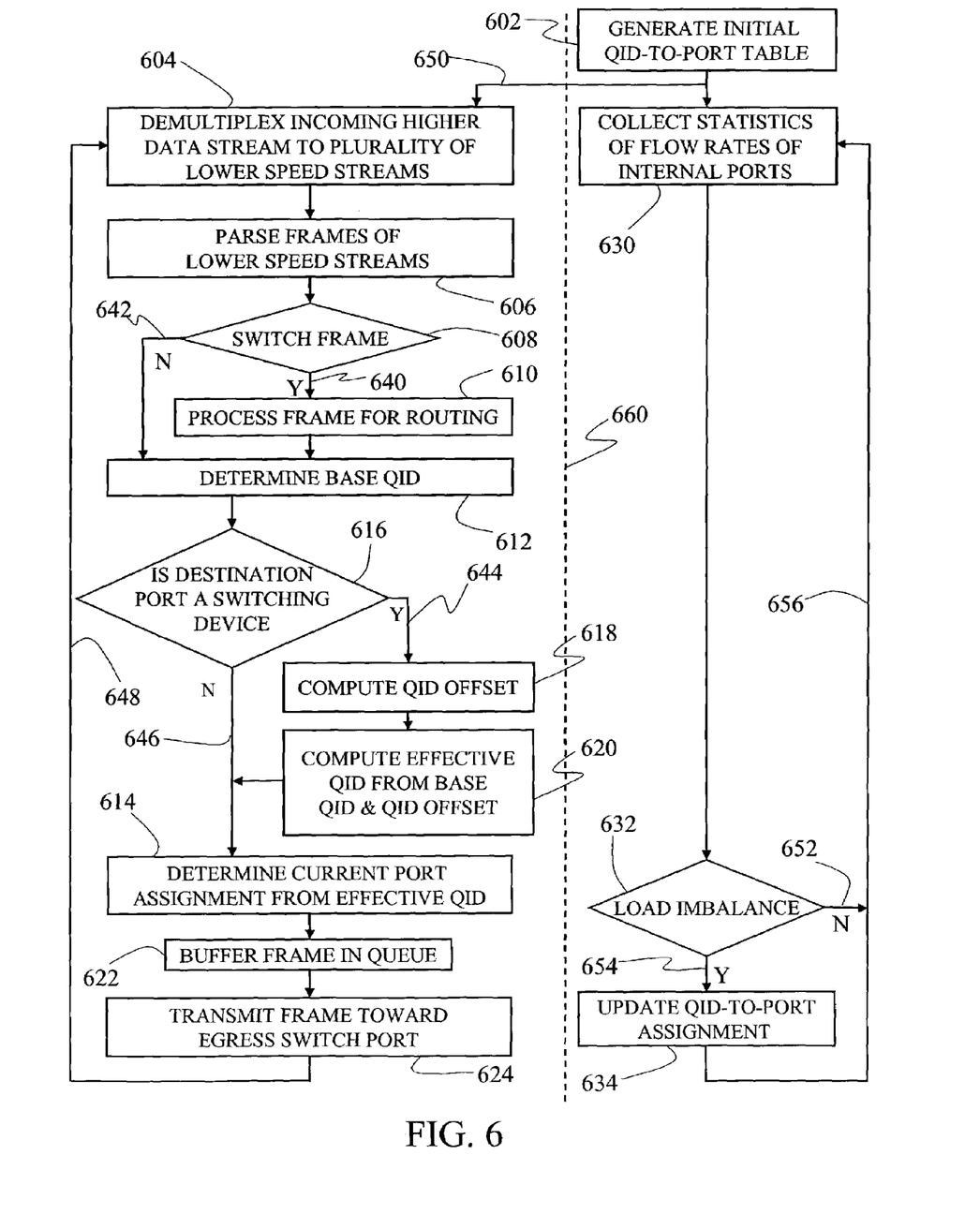
FIG. 6 is a flow diagram illustrating the method by which an ingress data stream is received by a first switching device and dynamically directed to a second switching device, according to the preferred embodiment of the present invention.

Referring to FIG. 6, a flow diagram of the method by which an ingress data stream is received by a first switching device and dynamically directed a second switching device, according to the preferred embodiment of the present invention, is illustrated. In FIG. 6, the diagrammatic flow has been segregated to represent functions that occur largely in hardware at wire speeds, left of line 660, and functions that occur largely in software, right of line 660.

When the system 100 is first activated or configured, the program manager 154 generates 602 the QID-to-port assignment table 512 corresponding to each of the classification devices of each switching device. The initial QID-to-port tables are preferably assigned with the incremental offset as between classification devices of a switching device, as described above, to reduce the effects of systematic imbalance due to a hash function, for example. The switching device 110, for example, then received the relatively high speed ingress data stream that is demultiplexed in step 604 into a plurality of relatively low speed ingress data streams. As described above, the plurality of relatively low speed ingress data streams are parsed in step 606 in order to learn the source and destination address, VLAN identification, and other information relevant to the processing of the stream. The switching device 110 in decision block 608 determines whether to switch 642 or route 640 the frame. If routed, the switching device performs additional steps 610 include updating the MAC source and destination addresses as well as decrementing the TTL counter, as well as other steps known to those skilled in the art. Whether switched or routed, a base QID is retrieved in step 612, prior to the frame being conveyed to the queue manager 506.

In the preferred embodiment, when the base QID assigned is determined in decision block 616 to be that of a intermediate port of a switching device as used in this application, the FRL 504 proceeds 644 to compute the offset in step 618. The offset, which when added to the base QID in the FRL 504 indicated by step 620, yields the effective QID. The QID offset is preferably generated from the frame's original source and destination address information using a second load balancing hash function. In some embodiments, the second load balancing hash function generates a plurality of effective QIDs for each intermediate port of an egress switching device. The effective QIDs further subdivide a data stream designated for each particular intermediate port of the egress switching device into a plurality of "bins" that map to the same intermediate port. Each bin, corresponding to a given second load balancing hash function result, therefore represents a fractional amount of the traffic being directed to a given intermediate port at any one time. A second load balancing hash function using five bits retained from the hash result, for example, would subdivide the twelve intermediate ports 170A-G into 32 fractional bins, each of which is substantially less than the 1 Gbps data flow capacity of any single intermediate port 170A-G.

The content of the frame and effective QID are preferably transmitted from the FRL 504 to the queue manager 506.

The effective QID is used by the queue manager 506 in step 614 to find the physical or intermediate port number from the QID-to-port table 512. This process determines an individual intermediate port of the plurality of intermediate ports 170A-G to which the frame is to be distributed. Whether a standard physical port or a intermediate port assignment, the frame is buffered in the appropriate queue of memory 220A-D according to step 622 prior to being tagged with the egress port number and conveyed to the egress switching device in step 624. The frame is subsequently forwarded to the egress switching device by way of the fabric 150 in the preferred embodiment, or by another inter-communication network such as the trunk link of an aggregation system. The steps associated with demultiplexing and classifying the ingress data stream are then repeated, as indicated by return path 648. With the plurality of classification devices 118A-D operating in parallel, the entire switching device maintains a throughput at the wire speed of the transport medium 102.

In parallel to the preceding steps for switching and routing frames, the program manager 154 monitors in step 630 one or more egress switching devices to anticipate or at the very least detect over-subscribed intermediate ports and or dropped frames. The statistics are continually collected in real-time, and conveyed to the program manager for analysis. When the program manager 154 detects an imbalance in decision block 632, the program manager 154 updates in step 634 the QID-to-port table 512 of one or more classification devices in order to redistribute the traffic to an under-subscribed intermediate port of the same egress switching device. Depending on the degree of load imbalance, the program manager 154 can update the QID-to-port table 512 of multiple classification devices of a single switching device, or in multiple switching devices that produce an egress data stream to the problematic intermediate port. The QID-to-port tables are periodically updated 656, e.g. every 60 seconds, concurrent with the processing of the ingress data stream. Note that the switching device of the preferred embodiment also conveys an egress dataflow from the fabric, although not illustrated in the flow diagram of FIG. 6.

Referring to update step 634, if the data flow corresponding to each intermediate port of a switching device is subdivided into bins as described above, the traffic that is reassigned at the QID-to-port table 512 from one intermediate port to another with a high degree of control. In particular, the data flow corresponding to a single bin may be selectively redirected from a first intermediate port to a second intermediate port in order to reduce the load at the first intermediate port and increase the load at the second intermediate port by the amount of traffic corresponding to that bin. The degree of load balancing that may be achieved is therefore only limited by the lowest flow bin of the plurality of bins associated with the group of intermediate ports of the particular egress switching device. The invention therefore yields a system and method by which very fine adjustments may be made to the internal load of a switching device, thereby providing a tool to correct or otherwise avoid load imbalance and dropped frames.

One or more of the components of the switching device of the present invention may be related to those inventions disclosed in U.S. Pat. Nos. 6,061,368, 6,094,430, 6,061,356, 6,047,024, 6,088,745, 6,041,057, and 6,070,243, which are hereby incorporated by reference.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

We claim:

1. A switching device operatively connected to a transport medium, to a fabric switching network including a plurality of switch ports; the switching device comprising:
    (a) an aggregator comprising a demultiplexer and an external switch port operatively coupled to the transport medium; wherein the demultiplexer receives an ingress data stream comprising a plurality of protocol data units at the external switch port, and generates a plurality of intermediate data streams;
    (b) a plurality of intermediate ports operatively coupled to the aggregator for receiving the plurality of intermediate data streams;
    (c) a plurality of classification devices, operatively coupled to the plurality of intermediate ports and fabric switching network, for distributing each protocol data unit to the fabric switching network in the direction of an egress switch port, the classification decives comprising flow resolution logic, queue manager, and internal port; wherein each protocol data unit is distributed to the fabric switching network in the direction of an egress switch port, wherein at least one egress switch port is associated with an egress switching device including a plurality of intermediate ports;
    (d) wherein the queue manager causes the protocol data units received from the aggregator to be buffed in queue memory in a plurality of queues associated with an egress switch port, each queue being designated by a queue identification and further wherein the queue manager causes the protocol data units received from the aggregator to be buffered in queue memory in a plurality of queues associated with an egress switch port, each queue being designated by a queue identification, wherein the queue identifications that map to the intermediate ports of the egress switching device are given by the sum of a base queue identification and a queue identification offset, the offset given by (J modulo (j+m), where J is the total number of intermediate ports of the egress switching device, j is an index representing the jth intermediate ports and ranges from zero to J−1, and m is an index representing the mth classification device of the ingress switching device;
    (e) a memory device, operably connected to the queue manager, for retaining a look-up table that maps each queue identification to one of a plurality of egress switch ports, wherein the look-up table further includes at least one queue identification for each of the intermediate ports of the egress switching device.

2. The switching device of claim 1, wherein the switching device further comprising:
    (a) an egress processor for transmitting protocol data units received from the fabric switching network to the plurality of intermediate ports; and
    (b) a multiplexer for generating an egress data stream from the protocol data units received from the plurality of intermediate ports.

3. The switching device of claim 1, wherein the number of classification devices is given by K, and the number of intermediate ports given by N; wherein N is greater than or equal to K.

4. The switching device of claim 3, wherein the N intermediate ports operably connect the aggregator to the K classification devices such that a subset of the N physical wiring connections associated with the demultiplexer are operably connected to K classification devices; said subset of the N physical wiring connections receiving more traffic as a result of the load imbalance resulting from the aggregator load balancing algorithm; whereby the load imbalance associated with the aggregator load balancing algorithm is substantially balanced amongst the classification devices.

5. The switching device of claim 1, wherein the queue identifications that map to intermediate ports of the egress switching device are consecutively ordered between 1 and J, where J equal the number of intermediate ports of the egress switching device.

6. The switching device of claim 1, wherein the queue identifications that map to the intermediate ports of the egress switching device are consecutively ordered, for each classification device; and the ordering of the queue identifications include a predetermined offset from classification device to classification device, of the ingress switching device.

7. The switching device of claim 1, wherein the queue identifications used within each classification device are generated by the flow resolution logic.

8. The switching device of claim 7, wherein the flow resolution logic generates effective queue identifications that are associated with the intermediate ports of an egress switching device from said queue identification associated with an intermediate port of said egress switching device and a queue identification offset.

9. The switching device of claim 1, wherein the memory device is a re-writable memory device operably coupled to a program manager that dynamically updates the look-up table in order to balance the load between the intermediate ports of an egress switching device.

10. The switching device of claim 9, wherein load is balanced by re-assigning egress data forwarded to over-utilized intermediate ports of an egress switching device to under-utilized intermediate ports of the same egress switching device.

11. The switching device of claim 10, wherein the program manager, operatively coupled to the plurality of classification devices of one or more egress switching devices, acquires traffic statistics necessary to monitor the load across the intermediate ports of one or more egress switching devices.

* * * * *